United States Patent
Meggiolan et al.

(10) Patent No.: US 11,091,220 B2
(45) Date of Patent: Aug. 17, 2021

(54) PAD AND BRAKE CALIPER FOR A BICYCLE DISC BRAKE

(71) Applicant: CAMPAGNOLO S.r.l., Vicenza (IT)

(72) Inventors: Mario Meggiolan, Creazzo (IT); Filippo Bove, Padua (IT)

(73) Assignee: Campagnolo S.r.l., Vicenza (IT)

( * ) Notice: Subject to any disclaimer, the term of this patent is extended or adjusted under 35 U.S.C. 154(b) by 76 days.

(21) Appl. No.: 16/515,487

(22) Filed: Jul. 18, 2019

(65) Prior Publication Data

US 2020/0039604 A1 Feb. 6, 2020

(30) Foreign Application Priority Data

Aug. 3, 2018 (IT) .......................... 102018000007793

(51) Int. Cl.
*F16D 65/847* (2006.01)
*B62L 1/00* (2006.01)
(Continued)

(52) U.S. Cl.
CPC .......... *B62L 1/005* (2013.01); *F16D 65/0068* (2013.01); *F16D 65/095* (2013.01);
(Continued)

(58) Field of Classification Search
CPC .. F16D 65/0068; F16D 65/095; F16D 65/847; F16D 55/225; F16D 2055/0016;
(Continued)

(56) References Cited

U.S. PATENT DOCUMENTS 3,277,985 A * 10/1966 Caskey ................. F16D 65/092
188/264 AA
7,905,335 B2 * 3/2011 Demers ............... F16D 65/0971
188/264 R
(Continued)

FOREIGN PATENT DOCUMENTS

DE 202016102626 U1 7/2016
DE 202016002789 U1 9/2016
(Continued)

OTHER PUBLICATIONS

Italian Search Report and Written Opinion in Italian Application No. 102018000007793, dated Apr. 16, 2019, with English translation.

*Primary Examiner* — Thomas W Irvin
(74) *Attorney, Agent, or Firm* — Volpe Koenig

(57) ABSTRACT

The invention relates to a pad for a bicycle disc brake. The pad comprises a support frame made of a first material having a first coefficient of thermal conductivity and a first coefficient of thermal expansion, an element made of friction-wearing material associated with a first portion of said support frame and a heat-dissipating element associated with a second portion of said support frame which is distinct from said first portion. The heat-dissipating element is made of a second material different from said first material and having a second coefficient of thermal conductivity greater than said first coefficient of thermal conductivity and a second coefficient of thermal expansion greater than said first coefficient of thermal expansion.

13 Claims, 8 Drawing Sheets

(51) Int. Cl.
*F16D 65/00* (2006.01)
*F16D 65/095* (2006.01)
*F16D 55/225* (2006.01)
*F16D 55/00* (2006.01)

(52) U.S. Cl.
CPC .......... *F16D 65/847* (2013.01); *F16D 55/225* (2013.01); *F16D 2055/0016* (2013.01); *F16D 2200/003* (2013.01); *F16D 2200/0021* (2013.01)

(58) Field of Classification Search
CPC ....... F16D 2065/789; F16D 2200/0021; F16D 2200/003
See application file for complete search history.

(56) References Cited

U.S. PATENT DOCUMENTS

| | | | | |
|---|---|---|---|---|
| 8,210,329 | B2* | 7/2012 | Demers | F16D 65/0971 188/264 R |
| 8,550,220 | B2* | 10/2013 | Iwai | B62L 1/00 188/264 A |
| 8,752,679 | B2* | 6/2014 | Arbesman | F16D 65/092 188/250 B |
| 8,869,956 | B2* | 10/2014 | Wen | F16D 65/847 188/264 R |
| 9,273,740 | B2* | 3/2016 | Moore | F16D 69/00 |
| 9,303,706 | B2* | 4/2016 | Wen | F16D 65/84 |
| 9,487,263 | B2* | 11/2016 | Iwai | F16D 65/847 |
| 10,088,002 | B2* | 10/2018 | Wen | F16D 65/0068 |
| 2013/0240306 | A1* | 9/2013 | Murphy | F16D 65/0006 188/73.37 |
| 2014/0060984 | A1* | 3/2014 | Tseng | F16D 65/092 188/251 R |
| 2014/0151168 | A1 | 6/2014 | Wen | |
| 2014/0224604 | A1* | 8/2014 | Arbesman | F16D 69/04 188/250 B |
| 2015/0090538 | A1* | 4/2015 | Moore | F16D 65/847 188/1.11 W |
| 2015/0090543 | A1* | 4/2015 | Moore | F16D 65/092 188/250 G |
| 2017/0184168 | A1* | 6/2017 | Wen | F16D 65/0068 |
| 2018/0362112 | A1* | 12/2018 | Meggiolan | B62L 1/005 |

FOREIGN PATENT DOCUMENTS

DE 102015117607 A1 4/2017
GB 2523090 A 8/2015

\* cited by examiner

PAD AND BRAKE CALIPER FOR A BICYCLE DISC BRAKE

CROSS REFERENCE TO RELATED APPLICATION

This application claims the benefit of Italian Application No. 102018000007793, filed on Aug. 3, 2018, which is incorporated herein by reference as if fully set forth.

FIELD OF INVENTION

The present invention relates to a pad for a bicycle disc brake.

The invention also relates to a brake caliper for a bicycle disc brake.

Throughout the present description and in the following claims, the term "bicycle" is used to indicate a racing bicycle, a mountain-bike, a roadster bicycle, or an electric bicycle (e-bike).

The invention has a preferred application in the field of racing bicycles.

BACKGROUND

As known, disc brakes are now commonly used in bicycles. Such brakes are indeed often preferred to conventional brakes of a different type in that they ensure a high braking force and, are less subject to problems caused by mud or water.

Typically, a disc brake comprises a brake caliper mounted on the frame of the bicycle (in particular on the fork or on the rear stays of the frame, depending on whether it is a disc brake for the front wheel or a disc brake for the rear wheel of the bicycle, respectively) and a brake disc mounted on the hub of the wheel.

Two or four opposed pads are provided inside the brake caliper. The brake disc rotates inside the space defined between the opposed pads. By actuating the brake lever, the pads are brought towards the brake disc, generating a friction on the brake disc and, consequently, braking the wheel.

Mechanically-controlled disc brakes and hydraulically-controlled disc brakes are known. In the former the movement of the pads following the actuation of the brake lever takes place through the effect of a pulling action exerted by a metallic cable associated with the brake lever and with the brake caliper that supports the pads. In the latter, the movement of the pads takes place through the effect of the thrusting action exerted on each pad by a hydraulic piston.

Each pad typically comprises a support frame configured to be coupled with the brake caliper and an element made of friction-wearing material (hereinafter also indicated as "brake lining") associated with the support frame and configured to slide on the brake disc during braking. The pads must be replaced when the brake linings reach a certain degree of wear.

The Applicant has observed that in use the maximum resistant power of the pad can be as high as 800 W and, particularly upon repeated braking, when for example the cyclists are in a group, or when riding downhill, the brake caliper can reach very high temperatures, up to about 90° C.

The heat generated during braking must be adequately removed since otherwise undesired phenomena can occur, like for example the "crystallization" or "burning" of the brake lining and the "fading". Such phenomena result in a substantial reduction of the friction coefficient of the brake lining and, consequently, a substantial drop in performance of the brake, as well as an undesired expansion of the support frame and/or of the brake lining.

Solutions adapted to allow removal of heat from the pads of the bicycle disc brakes are known.

U.S. Pat. No. 8,550,220 describes a disc brake in which the pads comprise a support plate 32, a cooling plate 30 and a brake lining 34. The cooling plate 30 is typically made of light alloy, such as aluminum or alloys thereof, and comprises heat-dissipating fins 72. The support plate 32 is typically made of stainless steel or another metallic material that is stronger and more rigid than the material of the cooling plate 30. The cooling plate 30 is arranged between the brake lining 34 and the support plate 32. The support plate 32 is housed in a recess 70 formed on a face of the cooling plate 30, whereas the brake lining 34 is housed in a recess 60 formed on the opposite face of the cooling plate 30.

The Applicant observed that in the pads disclosed in U.S. Pat. No. 8,550,220 it is not possible to ensure a stable support of the brake lining 34 inside the brake caliper since the brake lining 34, whilst being fixed to the support plate 32, is coupled with the cooling plate 30, which is made of a material having a coefficient of thermal expansion very different from that of the support plate 32. Due to the heat generated during braking relative movements between support plate 32 and cooling plate 30 can thus occur. Such relative movements can cause undesired movements between brake lining 34 and support plate 32, with the risk of compromising the precision, reliability and repeatability of braking of the disc brake. Furthermore, due to the combined thermal expansion of the cooling plate 30, of the support plate 32 and of the brake lining 34, detachment of material can occur at the through holes, and, due to the difference in mutual expansion, detachment between the brake lining and the support frame can also occur, such detachments being worsened by the expansion of the glue in the mutual contact surfaces.

The technical problem at the basis of the present invention is that of providing a pad for a bicycle disc brake that ensures an extremely efficient heat removal and at the same time an optimal precision, reliability and repeatability of braking, without running the risk of undergoing structural failure, in particular of generating cracks in the material of the brake lining.

SUMMARY

The solution provides a bicycle disc brake pad that has a support frame made of a first material having a first coefficient of thermal conductivity and a first coefficient of thermal expansion. An element made of friction-wearing material is associated with a first portion of the support frame and a heat-dissipating element is associated with a second portion of the support frame. The heat-dissipating element is made of a second material that is different from the first material and has a second coefficient of thermal conductivity greater than the first coefficient of thermal conductivity and a second coefficient of thermal expansion that is greater than the first coefficient of thermal expansion.

BRIEF DESCRIPTION OF THE DRAWINGS

Further features and advantages of the invention will become clearer from the description of a preferred embodiment thereof, made with reference to the attached drawings, wherein.

DETAILED DESCRIPTION OF THE PREFERRED EMBODIMENTS

Figure 1:
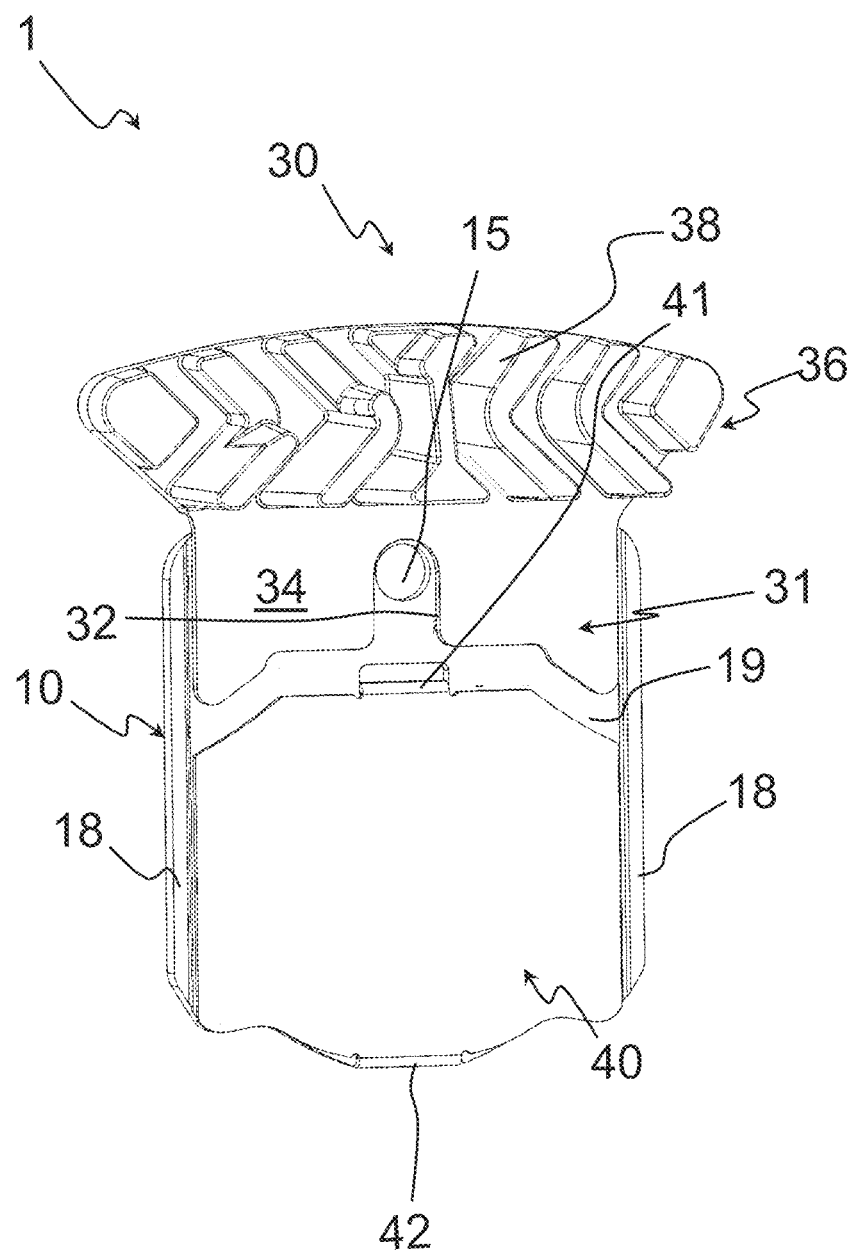
FIG. 1 is a schematic perspective view of a pad for a bicycle disc brake in accordance with the present invention.

The present invention therefore relates, in a first aspect thereof, to a pad for a bicycle disc brake, comprising a support frame made of a first material having a first coefficient of thermal conductivity and a first coefficient of thermal expansion, an element made of friction-wearing material associated with a first portion of said support frame and a heat-dissipating element associated with a second portion of said support frame which is distinct from said first portion, wherein said heat-dissipating element is made of a second material different from said first material and has a second coefficient of thermal conductivity greater than said first coefficient of thermal conductivity and a second coefficient of thermal expansion greater than said first coefficient of thermal expansion.

Advantageously, making the support frame and the heat-dissipating element of materials having different coefficients of thermal conductivity and coupling the heat-dissipating element with a portion of the support frame which is distinct from the portion which the brake lining is coupled with allows an optimal transfer of heat by thermal conduction from the brake lining towards the heat-dissipating element through the support frame and an optimal removal of heat by thermal convection from the heat-dissipating element towards the outside environment. Furthermore, coupling the heat-dissipating element only with the support frame, which is made of a material having a coefficient of thermal expansion lower than that of the material which the heat-dissipating element is made of, makes it possible to ensure a stable support of the brake lining by the support frame.

Preferably, said first portion of said support frame is defined on a first face of said support frame and said second portion of said support frame is defined on a second face of said support frame opposite said first face.

The heat-dissipating element is thus arranged on the opposite face to the face where the element made of friction-wearing material is mounted on, so as to be protected during braking, which results in the progressive wearing of the brake lining.

Preferably, said support frame comprises, on said second face, opposite projecting side edges and a recess defined between said opposite projecting side edges.

Such a provision allows an effective mounting of the heat-dissipating element on the support frame.

Preferably, said heat-dissipating element comprises a mounting portion coupled with said second portion of said support frame and a service portion projecting cantilevered with respect to said support frame.

The service portion projecting cantilevered effectively performs the heat-dissipating function thanks to the heat exchange by convection with the air, whereas the mounting portion makes it possible both to mount the heat-dissipating element on the support frame and to transfer the heat from the support frame to the service portion.

Preferably, said mounting portion is housed substantially flush in a first zone of said recess.

In the present description and in the following claims, the expression "housing substantially flush in a recess" is used to indicate a housing of the aforementioned mounting portion in the aforementioned recess such that the mounting portion does not project with respect to the side edges of the support frame, or projects only slightly.

The mounting portion of the heat-dissipating element is substantially embedded in the support frame and thus it does not occupy further thickness in the caliper with respect to that (or significantly more than that) occupied by the support frame.

Preferably, said service portion comprises a plurality of fins.

More preferably, said plurality of fins includes first fins that extend cantilevered from a first front surface of said heat-dissipating element which faces towards said second face.

Even more preferably, said plurality of fins includes second fins that extend cantilevered from a second front surface of said heat-dissipating element which faces on the opposite side with respect to said first front surface.

Thanks to the fact that the service portion projects cantilevered with respect to the support frame it is possible to provide two series of fins facing on opposite sides with respect to the support frame, thus achieving a high heat exchange with the surrounding air.

Preferably, each of said first fins has a height lower than the height of each of said second fins.

In the present description and in the following claims, the expression "height" of the fin is used to indicate the extension of the fin in a direction substantially perpendicular with respect to the support frame, which is substantially flat.

The height of the first fins is limited by the fact that they face on the same side as the brake lining, so that they cannot be higher than the height of maximum wear of the brake lining, in order to avoid coming into contact with the first fins of the opposite pad during braking. The height of the second fins can, on the other hand, be maximized.

Preferably, some fins of said second fins have at least in part a height lower than the height of the remaining fins of said second fins.

Such a provision makes it possible to leave a maneuvering space for the mounting tool which is used to mount the brake caliper on the frame of the bicycle.

Preferably, each of some fins of said second fins have a three-dimensional shape different from that of each of the remaining fins of said second fins.

Advantageously, the three-dimensional shape of each of the aforementioned fins is optimized to increase as much as possible the heat exchange surface, compatibly with the need to leave the aforementioned maneuvering space.

In a preferred embodiment, the pad comprises a vibration damping element associated with said support frame.

Such a vibration damping element considerably, if not actually totally, absorbs the vibrations that can be generated on the pad when the brake is actuated, thus preventing such vibrations from negatively influencing the braking.

Preferably, said vibration damping element is associated with the support frame at a third portion of said support frame which is distinct from said second portion.

Preferably, said third portion is defined on said second face of said support frame.

Preferably, said vibration damping element is housed substantially flush in a second zone of said recess which is distinct from said first zone.

Advantageously, also the vibration damping element is substantially embedded in the support frame and thus it does not occupy further thickness in the caliper with respect to that (or significantly greater than that) occupied by the support frame.

Preferably, said first material is steel or ferromagnetic material.

Such a material ensures excellent properties of structural strength, limited or substantially zero deformability due to the heat and good properties of heat conduction. Furthermore, the provision of a support frame made of steel or ferromagnetic material makes it possible to fasten the pad to the caliper also through magnetic fastening systems.

Preferably, said second material is aluminum or alloys thereof.

Such a material ensures excellent properties of heat dissipation.

Preferably, said heat-dissipating element is defined by a solid body provided with a single through opening.

Preferably, such a through opening is shaped like an open slot.

Such a slot is necessary to allow the passage of the mounting pin used to mount the pad in the brake caliper. Further to the slot, the heat-dissipating element is a solid body that, since it does not have through holes, it does not hinder the thermal flow that moves from the brake lining towards the fins.

Preferably, said heat-dissipating element is fixed to said support frame through chamfering.

The heat-dissipating element is typically made by molding and the connection thereof by chamfering to the support frame, besides being particularly easy, allows a stable and reliable coupling to be obtained.

Preferably, the coupling between heat-dissipating element and support frame is obtained through orbital chamfering, where the term "orbital chamfering" is used to indicate the action of a substantially frusto-conical (or conical) or frusto-pyramidal (or pyramidal) punch that rotates slightly eccentrically and moves axially in the direction joining the vertex of the pyramid/cone to the base of the pyramid/cone or, alternatively, in the direction perpendicular to the base of the pyramid/cone.

Alternatively, the coupling between heat-dissipating element and support frame is obtained through a chamfering obtained using a pin having a frusto-conical end.

In a second aspect thereof, the invention relates to a brake caliper for a bicycle disc brake, comprising a main body configured to be associated with a bicycle frame, the main body comprising a slit in which at least one pair of pads in accordance with the present invention are housed.

Consequently, the brake caliper for a bicycle disc brake has all of the advantages indicated above with respect to the pad of the invention.

Preferably, the mounting portion of the heat-dissipating element occupies a recess provided in the brake caliper and, therefore, it does not project with respect to the brake caliper.

In FIG. 1, reference numeral 1 indicates a pad for a bicycle disc brake in accordance with the present invention.

Figure 5:
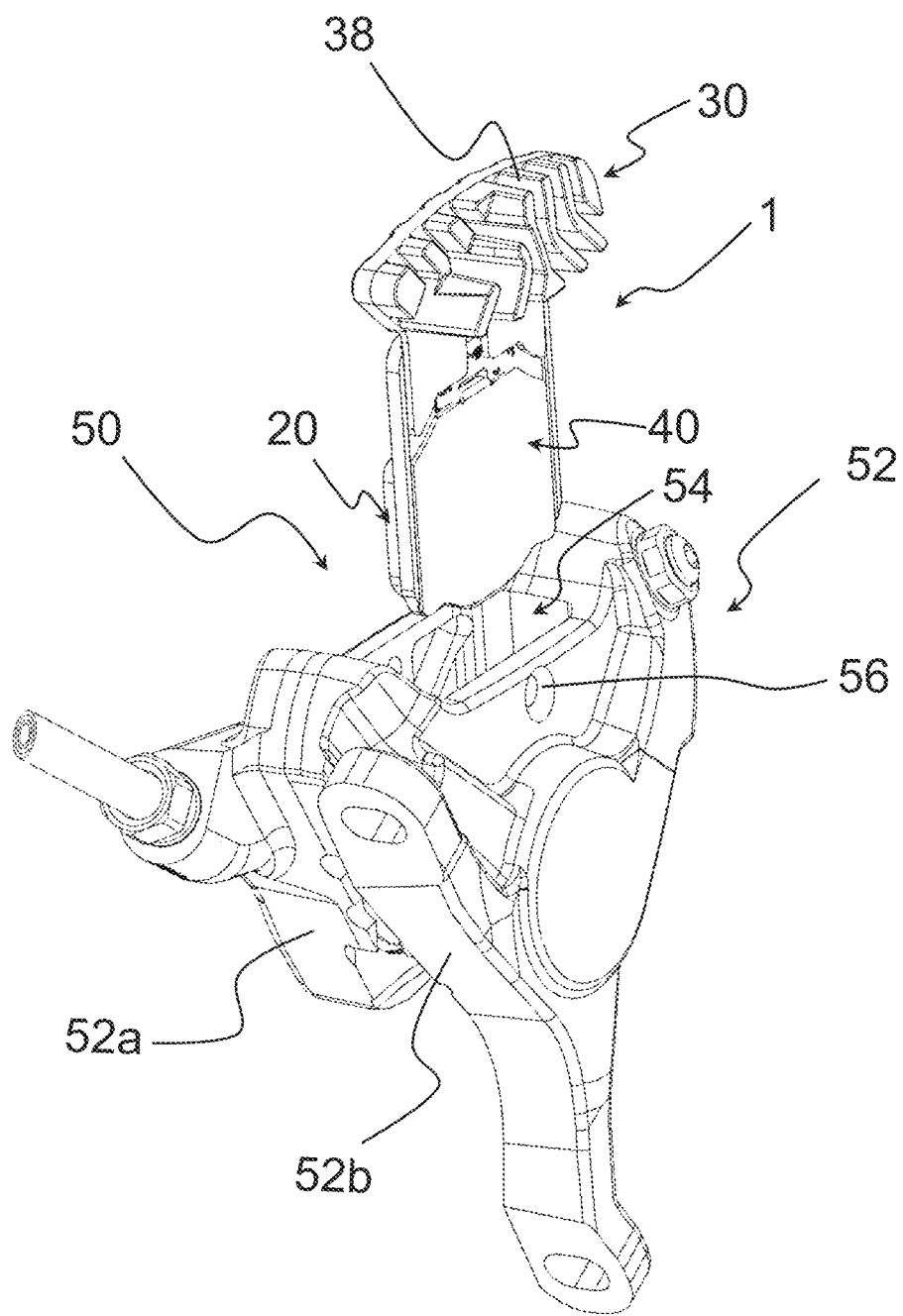
FIG. 5 is a schematic perspective view of a brake caliper in accordance with the present invention, wherein an insertion step of the pad of FIG. 1 is shown.

The disc brake comprises a brake caliper 50, which is shown in FIG. 5 and in the subsequent figures, configured to be associated with the frame (not shown) of a bicycle and a brake disc (not shown) configured to be associated with a hub (not shown) of a front or rear wheel of the bicycle.

The brake caliper 50 of the attached figures is associated with the portion of bicycle frame at which the front wheel of the bicycle is mounted.

What is described hereinafter with reference to the pad 1 and to the relative disc brake is identically valid in the case of a disc brake for a rear wheel of the bicycle.

At least two opposed pads 1 in accordance with the present invention are provided inside the brake caliper 50.

The brake caliper 50 comprises a main body 52 provided with a slit 54 which is accessible from the outside and in which the pads 1 are inserted and housed. The slit 54 has a plane of symmetry substantially coinciding with a transversal mid-plane of the main body 52, which in turn coincides with the mid-plane of the brake disc.

The main body 52 shown in the figures is obtained by assembling, for example through screws, two distinct pieces 52a, 52b and the aforementioned opening 54 is defined between the aforementioned pieces 52a, 52b. The main body, however, could also be made in a single piece or by a plurality of distinct pieces.

Elements can be provided on the main body 52 in order to dissipate the heat generated during braking at the pads 1.

The brake disc comprises a radially outer annular portion that is arranged inside the space defined between the pads 1. By actuating the brake lever (not shown), the pads 1 are brought towards the brake disc (which rotates as a unit with the wheel of the bicycle), generating a friction on the brake disc and, consequently, braking the wheel.

The pad 1 comprises a support frame 10 configured to be associated with the brake caliper 50. An element made of friction-wearing material 20 and a heat-dissipating element 30 are associated with the support frame 10.

The support frame 10 is made of a first material having a first coefficient of thermal conductivity and a first coefficient of thermal expansion. Typically, such a material is steel or a ferromagnetic material. For example, it is possible to use forming steel.

The heat-dissipating element 30 is made of a second material different from the first material. The second material has a second coefficient of thermal conductivity that is greater than the first coefficient of thermal conductivity and a second coefficient of thermal expansion that is greater than the first coefficient of thermal expansion. Typically, the second material is aluminum or alloys thereof.

In preferred embodiments thereof, the heat-dissipating element 30 is made of aluminum alloys series 6000 and 1000. For example, it is possible to use alloy 6061, which has a density of about 2.7 kg/dm3, a coefficient of thermal expansion of about $23.6*10{-6}$ and a coefficient of thermal conductivity at 20° C. of about 167 W/(m*K).

On the other hand, the support frame 10 can be made of a carbon steel C 0.18%, which typically has a coefficient of thermal expansion of about $12*10{-6}$ and a coefficient of thermal conductivity of about 79 W/(m*° C.).

The element made of friction-wearing material 20 can be made of organic materials, like for example glass fibers or copper fibers with resins or, preferably, of metallic materials, like for example sintered metallic powders.

The support frame 10 is substantially flat and symmetrical with respect to a transversal mid-plane X.

Figure 2:
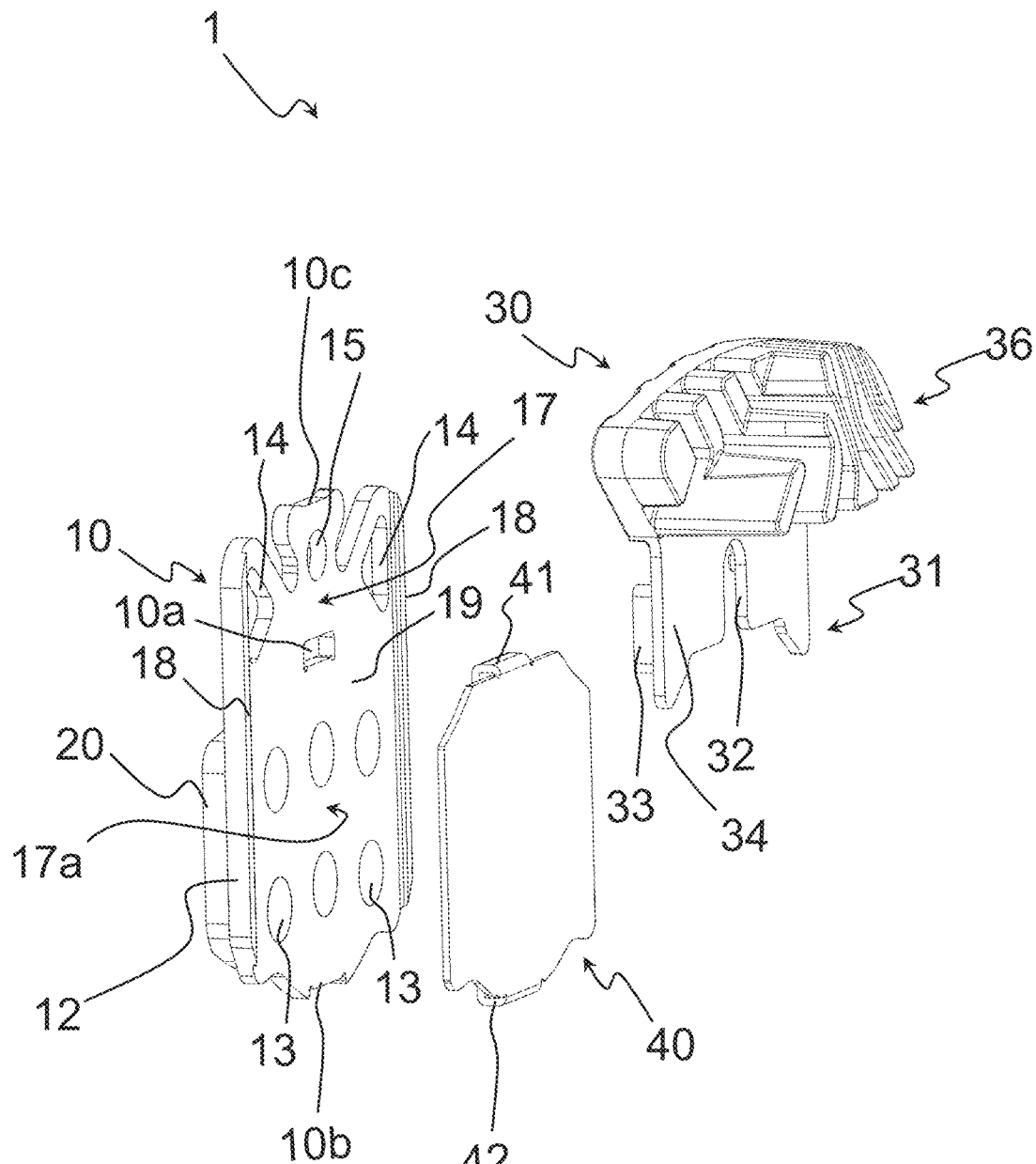
FIG. 2 is an exploded schematic perspective view of the pad of FIG. 1.

The element made of friction-wearing material 20 is associated with a first portion 12 of a first front face 11 (FIG. 3) of the support frame 10 (FIG. 2).

In the non-limiting example shown in the figures, the heat-dissipating element 30 is associated with a second portion 17 of a second front face 16 of the support frame 10, such a second face 16 (FIG. 3) being opposite to the first face 11 (FIG. 2).

In alternative embodiments that are not shown, the second portion of the support frame 10 which the heat-dissipating element 30 is associated with could also be made on the first front face 11 of the support frame 10, in any case being distinct from the first portion 12 of the support frame 10.

The support frame 10 comprises, on the second face 16 thereof, opposite side edges 18 which project in a direction substantially perpendicular with respect to the support frame 10 and between which a recess 19 is defined.

Figures 3, 4:
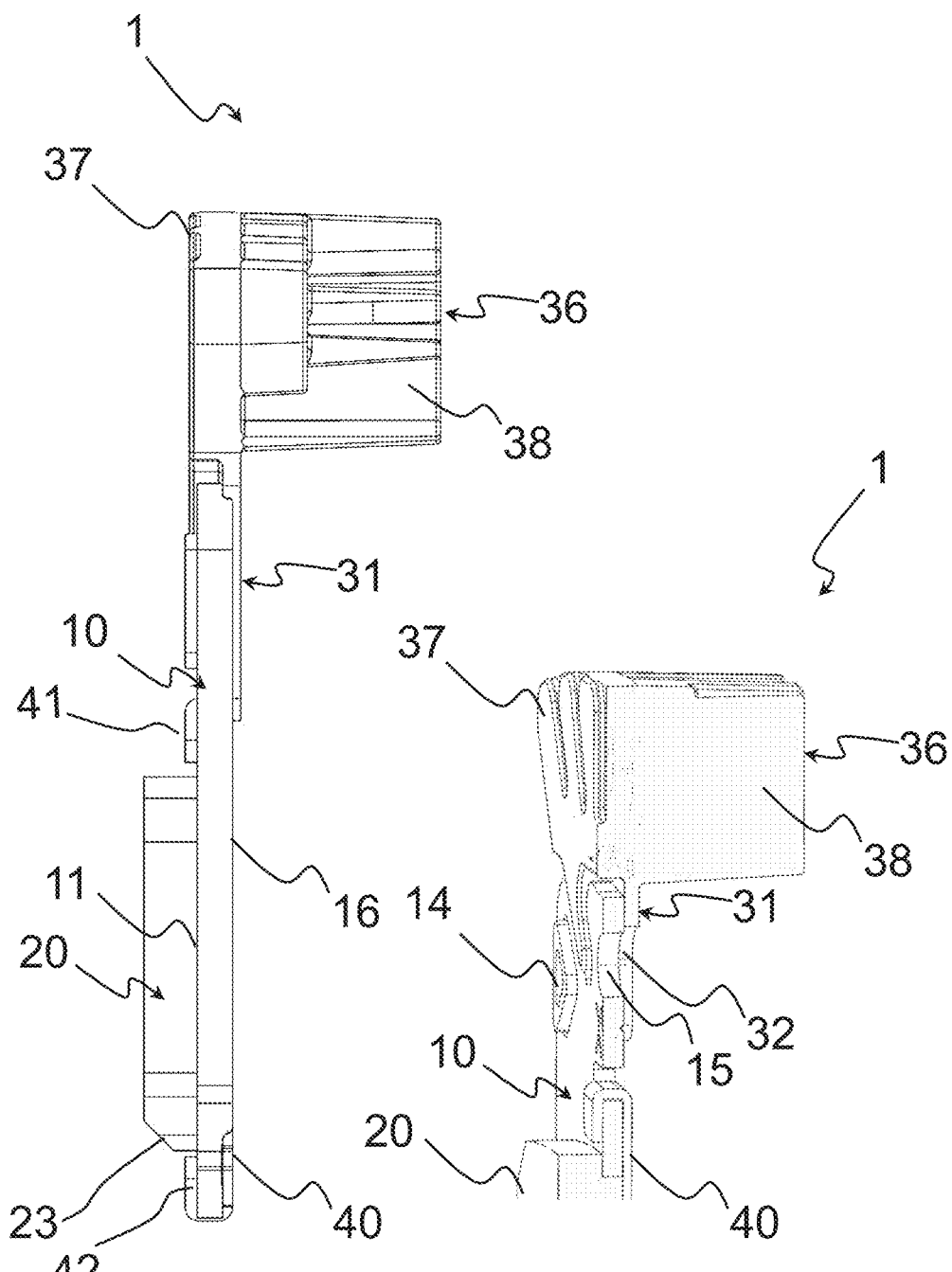
FIG. 3 is a schematic side view of the pad of FIG. 1.
FIG. 4 is a schematic perspective section view of a portion of the pad of FIG. 1.

The heat-dissipating element 30 is defined by a solid body 34 comprising a mounting portion 31 coupled with the second portion 17 of the support frame 10 and a service portion 36 projecting cantilevered with respect to the support frame (FIG. 3).

The mounting portion 31 is housed substantially flush in a first upper zone of the recess 19, so as not to project (or project only a little) with respect to the side edges 18 of the support frame 10.

In the present description and in the following claims the expressions "upper", "lower", "side" and similar are used referring to a view of the pad 1 oriented like in FIG. 1 herewith attached.

The mounting portion 31 is substantially flat.

The heat-dissipating element 30 has a single through opening 32 made in the lower portion of the mounting portion 31. The through opening 32 is shaped like an open slot and is configured to allow the passage of a mounting pin (not shown) to be used for mounting the pad 1 in the brake caliper 50. Such a mounting pin also passes in a respective through hole 56 made in the main body 52 of the brake caliper 50 and in a respective through hole 15 made on the support frame 10. The transversal mid-plane X passes through the center of the through hole 15.

Preferably, the mounting portion 31 of the heat-dissipating element 30 is fixed to the support frame 10 through chamfering, more preferably through an orbital chamfering or a chamfering obtained using a pin having a frusto-conical end.

On a front face of the mounting portion 31 facing towards the second face 16 of the support frame 10 two projections 33 are made. The two projections 33 extend in a direction substantially perpendicular to the mounting portion 31. The two projections 33 are substantially triangle-shaped and are inserted in respective through openings 14 made on the support frame 10 and arranged symmetrically with respect to the transversal mid-plane X.

The service portion 36 comprises first fins 37 that extend cantilevered, in a direction substantially perpendicular with respect to the mounting portion 31, from a first front surface of the heat-dissipating element 30 which faces towards the second face 16 of the support frame 10, and second fins 38 that extend cantilevered, again in a direction substantially perpendicular with respect to the mounting portion 31, from a second front surface of the heat-dissipating element 30 which faces on the opposite side with respect to the aforementioned first front surface.

Each of the first fins 37 has a height lower than the height of each of the second fins 38.

As shown in FIG. 3, the height of the first fins 37 is limited by the fact that they cannot be higher than the height of maximum wear of the element made of friction-wearing material 20.

Figure 7:
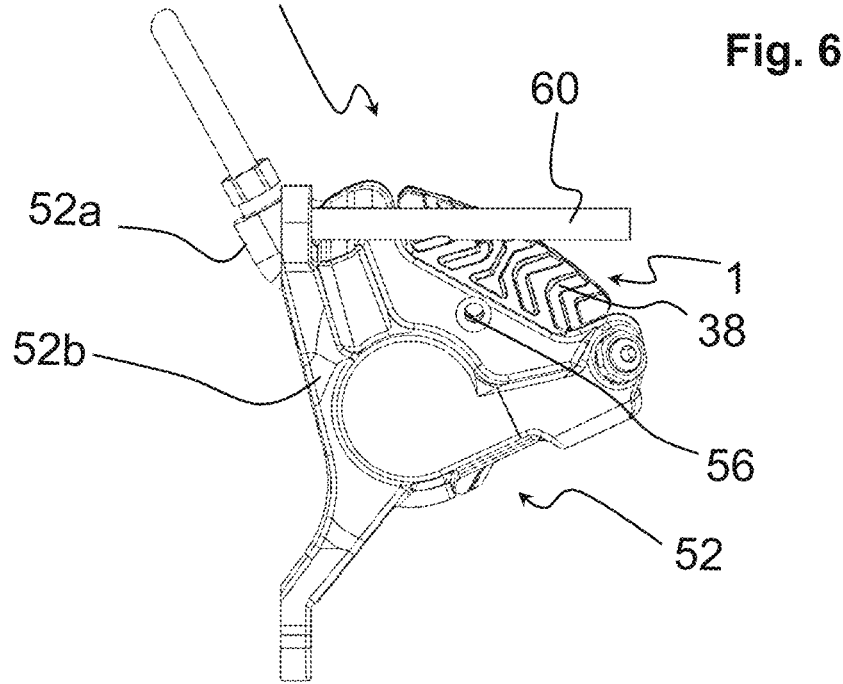
FIG. 7 is a schematic front view of the brake caliper of FIG. 6, wherein a mounting tool used to mount the brake caliper on the frame of the bicycle is also schematically shown.

As shown in FIGS. 2 and 7, some of the second fins 38 have at least in part a height lower than the height of the remaining second fins 38 so as to leave a maneuvering space for a mounting tool 60, such as an adjustment tool, used to mount the brake caliper 50 on the frame of the bicycle.

Furthermore, as shown in FIG. 1, some of the second fins 38 have each a three-dimensional shape different from that of each of the remaining second fins 38.

Figure 8:
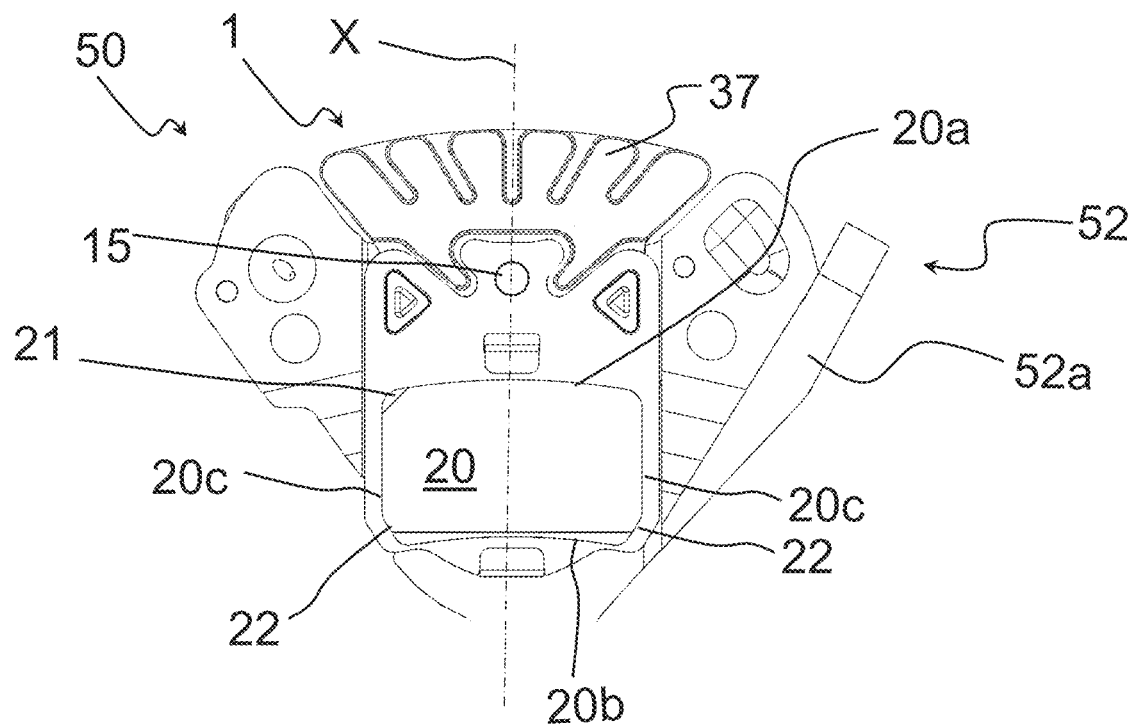
FIGS. 8 and 9 are two schematic front views of portions of the brake caliper of FIG. 6.
Figure 9:
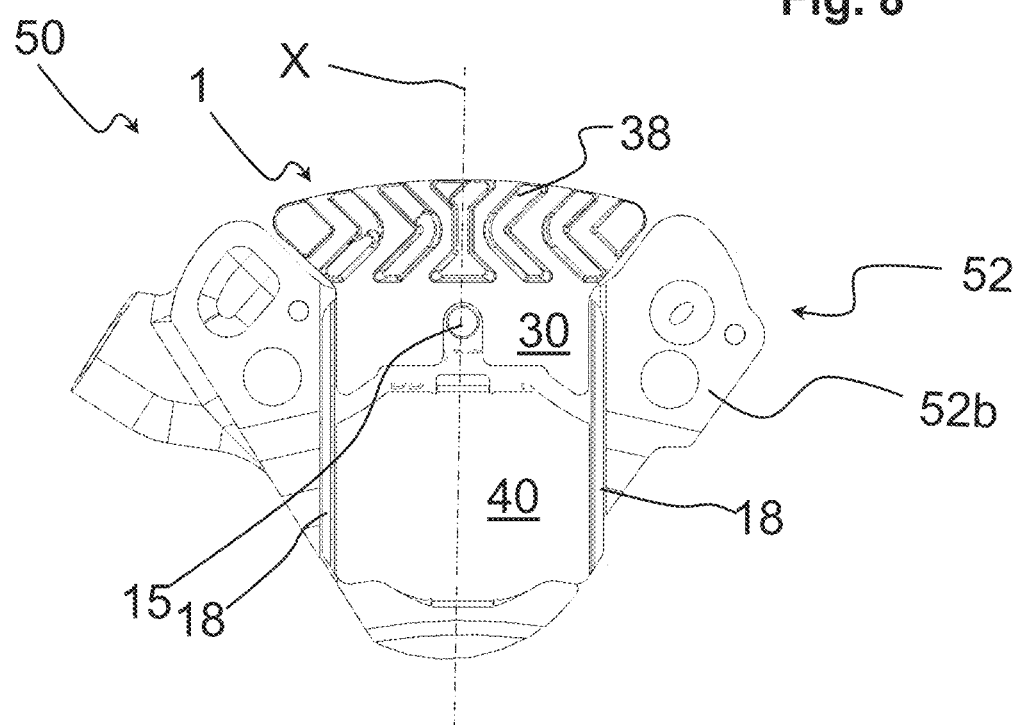

The element made of friction-wearing material 20 and the first portion 12 which supports the element made of friction-wearing material 20 are substantially rectangle-shaped (FIG. 8).

The element made of friction-wearing material 20 comprises an upper surface 20a, a lower surface 20b substantially parallel to the upper surface 20a, and a pair of opposite side surfaces 20c substantially perpendicular to the upper and lower surfaces 20a, 20b.

The upper surface 20a is slightly convex, whereas the lower surface 20b is slightly concave.

The element made of friction-wearing material 20 has a predetermined thickness and comprises, typically in a side end zone of the upper portion thereof, a visual wear indicator 21. In particular, as shown in FIG. 8, the visual wear indicator 21 is defined at an edge where the upper surface 20a joins to one of the side surfaces 20c of the element made of friction-wearing material 20. In alternative embodiments, the visual wear indicator 21 is provided on both the side end zones of the upper portion of the element made of friction-wearing material 20.

As shown in FIG. 3, the element made of friction-wearing material 20 comprises a beveled lower portion 23. Such a beveled lower portion 23 extends along the lower surface 20b of the element made of friction-wearing material 20 and comprises opposite side end zones each having a tapering 22.

The tapering 22 is defined at the opposite edges where the lower surface 20b joins to the side surfaces 20c of the element made of friction-wearing material 20.

In alternative embodiments of the pad 1 of the present invention, the tapering 22 is defined only at one of the opposite side end zones of the beveled lower portion 23 of the element made of friction-wearing material 20.

As shown in FIG. 2, the first portion 12 which supports the element made of friction-wearing material 20 comprises a plurality of through holes 13 (six in the specific example illustrated herein) that house by interference corresponding portions of the element made of friction-wearing material 20. The latter is therefore coupled with the support frame 10 by interference in the through holes 13 and, preferably, by gluing on a surface of the first portion 12 of the support frame 10. In FIG. 2, reference numeral 13 is associated with only some of the aforementioned through holes.

The coupling by interference between the element made of friction-wearing material 20 and the support frame 10 at the holes 13 ensures an optimal heat exchange and also ensures that the risk of detachment of the element made of friction-wearing material 20 due to stresses during braking is minimized.

Alternatively or additionally, the provision of a support frame 10 made of steel or ferromagnetic material makes it possible to fasten the pad 1 to the brake caliper 50 also through magnetic fastening systems.

As shown in the figures, the pad 1 further comprises a vibration damping element 40 associated with the support frame 10.

As shown in FIG. 2, the vibration damping element 40 is associated with a third portion 17a of the second front face 16 of the support frame 10, said third portion 17a being distinct from the aforementioned second portion 17. The third portion 17a is substantially adjacent to the second portion 17 and is defined in the recess 19 of the support frame 10 as well.

Therefore, the vibration damping element 40 is housed substantially flush in a second zone of the recess 19 distinct from the first zone where the mounting portion 31 of the heat-dissipating element 30 is housed and substantially adjacent to the aforementioned first zone. In particular, the aforementioned second zone is arranged below the aforementioned first zone.

Also the vibration damping element 40 does not project with respect to the side edges 18 of the support frame 10, or projects only slightly.

The vibration damping element 40 comprises two opposite portions 41 and 42 for fastening to the support frame 10 (FIGS. 2 and 3). The portions 41, 42 are substantially foldable and are clamped to the support frame 10 at a through opening 10a and at a side recess 10b formed in the support frame 10. The through opening 10a and the side recess 10b are arranged at the transversal mid-plane X of the support frame 10.

Preferably, the vibration damping element 40 comprises at least one layer of metallic material in order to achieve an effective damping of the vibrations. The metallic material can be steel or a ferromagnetic material.

In a preferred embodiment of the pad 1, the aforementioned layer of metallic material is associated with at least one layer of anti-rust material, preferably arranged between two layers of anti-rust material. By this provision an effective vibration damping action is obtained also in case a possible prolonged contact of the pad 1 with mud or water occurs.

In an alternative embodiment, the layer of metallic material is associated with at least one layer of rubber, which is preferably a fluoropolymer. More preferably, the layer of metallic material is arranged between two layers of rubber.

In further embodiments, the vibration damping element 40, further to comprise the aforementioned layer of metallic material, comprises both two layers of anti-rust material and two layers of rubber, or a single layer of anti-rust material and two layers of rubber, or a single layer of rubber and two layers of anti-rust material. The mutual positioning of the aforementioned layers of anti-rust material and of rubber and the positioning of such layers with respect to the layer of metallic material can be whatever.

The vibration damping element 40 has an outer profile having a substantially rectangular shape, with the two longer parallel sides resting substantially at the two projecting side edges 18 of the support frame 10. Such side edges 18 makes it possible to avoid undesired movements of the vibration damping element 40 with respect to the support frame 10 and, consequently, to avoid a reduction of the effectiveness of the vibration damping action and/or a disadvantageous interference with the braking action carried out by the element made of friction-wearing material 20.

The vibration damping element 40 preferably comprises at least one layer of ferromagnetic material, at least one layer of rubber and at least one layer of adhesive.

Basically, in the embodiment of the pad 1 shown in the attached figures, face 11 of the support frame 10 has the first portion 12 (with the element made of friction-wearing material 20 associated therewith) at the bottom, whereas the second face 16 of the support frame 10 has the second portion 17 (with the mounting portion 31 of the heat-dissipating element 30 associated therewith) at the top and the third portion 17a (with the vibration damping element 40 associated therewith) at the bottom.

Figure 6:
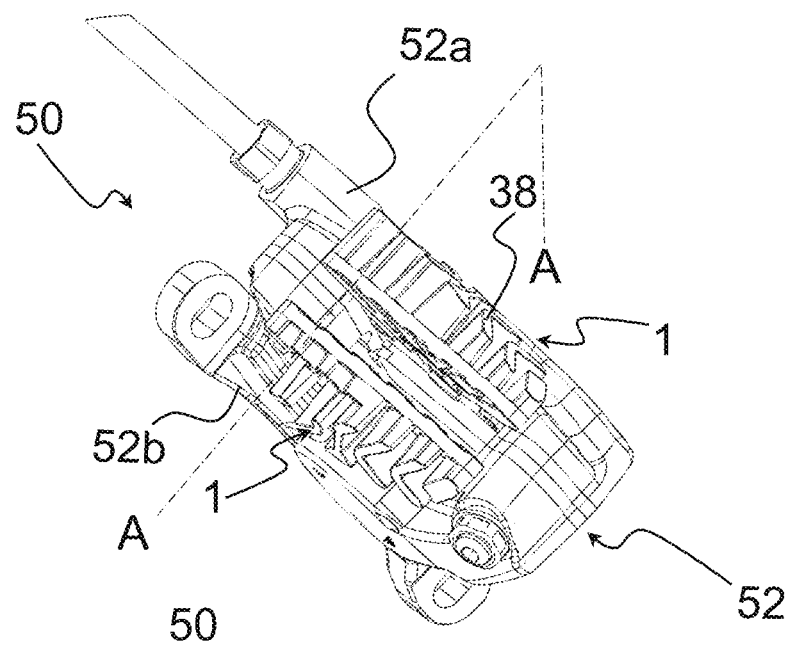
FIG. 6 is a schematic perspective view of the brake caliper of FIG. 5, wherein the pad of FIG. 1 has been inserted.

With reference to FIGS. 6 and 7, once the pad 1 is mounted in the brake caliper 50, the service portion 36 of the heat-dissipating element 30 is arranged, substantially entirely, outside of the slit 54 of the main body 52 of the brake caliper 50. In this way the fins 37, 38 of the heat-dissipating element 30 are in direct contact with the air outside of the brake caliper 50, so that the heat is dissipated quickly through the heat exchange by convection with the air.

The mounting portion 31 of the heat-dissipating element 30 occupies a recess provided in the brake caliper 50 and, therefore, it does not project with respect to the brake caliper 50.

The support frame 10 also comprises a gripping handle 10c provided for moving the support frame 10 (FIG. 2). In particular, the gripping handle 10c extends on an upper end of the support frame 10, above the through hole 15.

Figure 10:
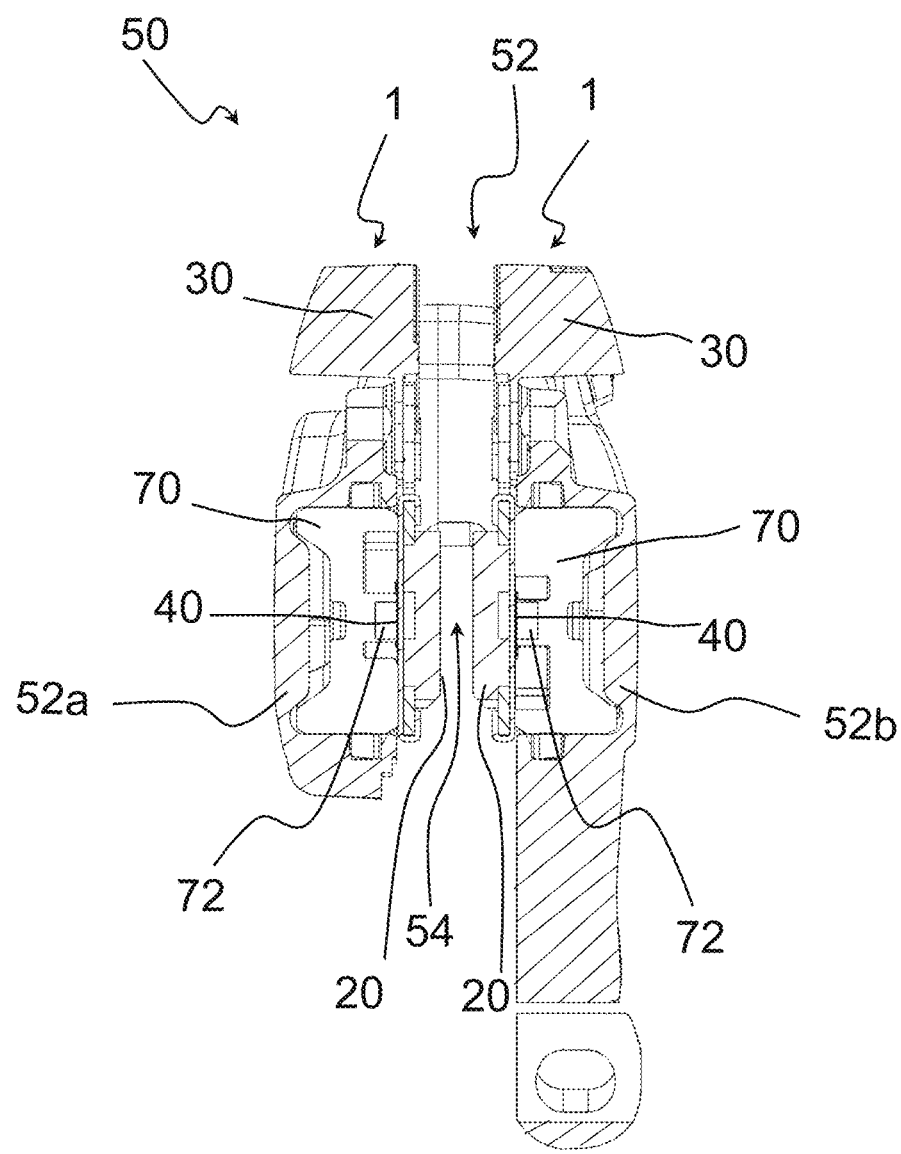
FIG. 10 is a schematic side and sectioned view of the brake caliper of FIG. 6 along plane A.
Figure 11:
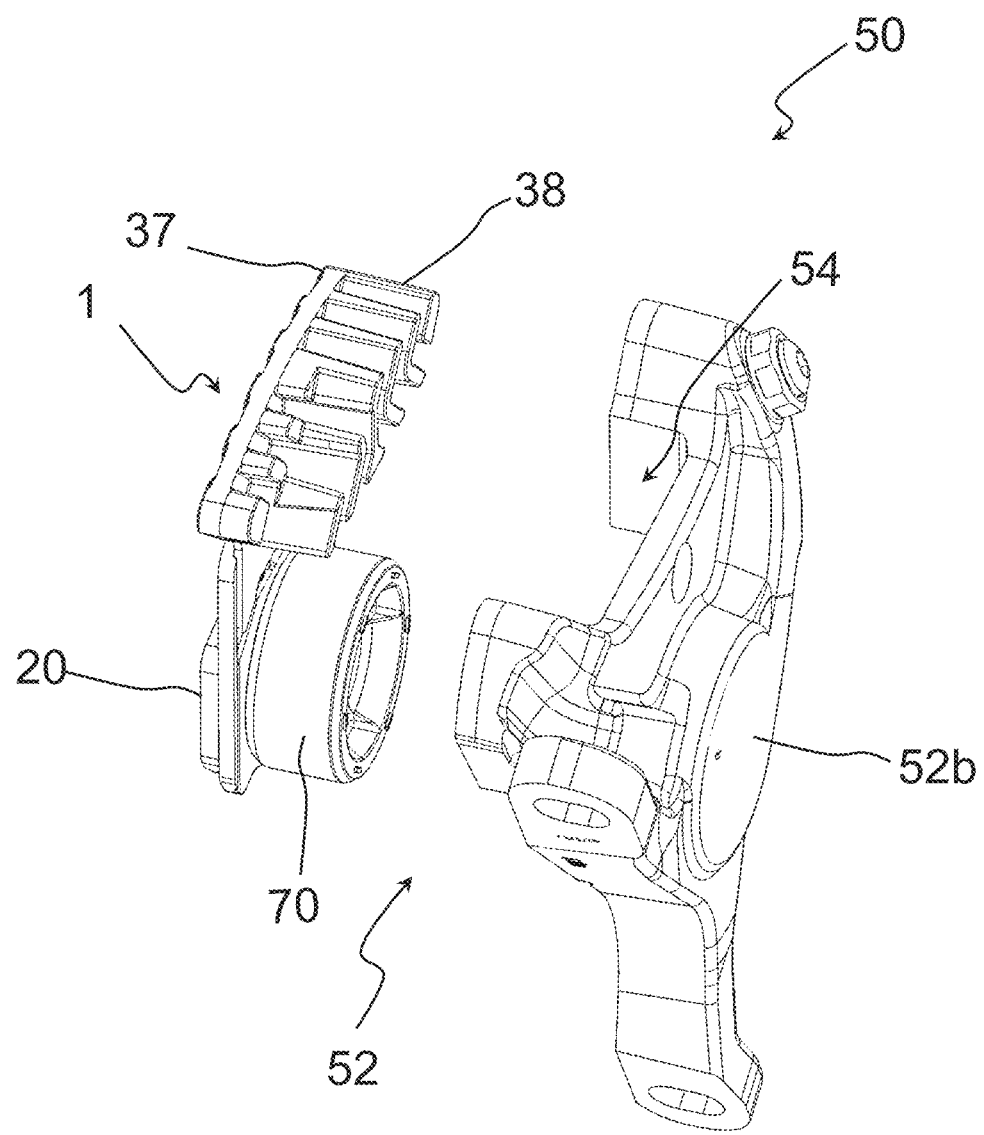
FIG. 11 is an exploded schematic perspective view of a part of the brake caliper of FIG. 6.

As shown in FIGS. 10 and 11, a pneumatic piston 70 is associated with the pad 1, in particular with the second face 16 of the support frame 10, through the vibration damping element 40. The pneumatic piston 70 belongs to a pneumatic circuit of a hydraulically-controlled disc brake. The action of the pneumatic piston 70 is exerted on the vibration damping element 40, whose function is to dampen the possible vibrations, and consequent noises, which can be generated during braking.

A magnetic element 72 is arranged between the pneumatic piston 70 and the support frame 10.

Such a magnetic element 72 is fixedly associated with the pneumatic piston 70 and coupled by magnetic attraction with the support frame 10. Alternatively or additionally to the magnetic element 72, it is possible to use a spring.

When the brake lever is actuated each pneumatic piston 70 pushes the respective pad 1 against the brake disc. When the brake lever is released, each pneumatic piston 70 goes back into the initial position thereof and each pad 1 moves away from the brake disc by means of the magnetic attraction on the support frame 10 (which as stated is made of steel or ferromagnetic materials) exerted by the magnetic element 72 fixedly connected to the respective pneumatic piston 70. Therefore, the disc brake is a hydraulically-controlled brake and the return of the pads 1 in the rest position when the brake is deactivated takes place thanks to the magnetic attraction exerted by the magnetic element 72 of the respective pneumatic piston 70 on the support frame 10.

In an alternative embodiment of a hydraulically-controlled disc brake, or additional with respect to the above, in place of the aforementioned magnetic element 72, or in addition thereto, a spring is arranged between the two support frames 10 of the pads 1 of the disc brake. When the brake lever is activated, each pneumatic piston 70 pushes the respective pad 1 against the brake disc, compressing the spring. When the brake lever is released, each pneumatic piston 70 goes back into the initial position thereof and each pad 1 moves away from the brake disc thanks to the elastic thrust exerted by the spring.

The provision of a spring, alone or together with the aforementioned magnetic element 72, is deemed advantageous to improve the stability of the pad 1 particularly in view of the increase in weight which the pad 1 is subjected to as a result of the provision of the heat-dissipating element 30.

The pad 1 described above can also be used in a manually-controlled disc brake.

The provision of the aforementioned heat-dissipating element 30 on the pad 1 allows evaluating different compositions for the compounds of the element made of friction-wearing material 20, including graphene as well, so as to increase the conductivity thereof. Furthermore, since the temperature of the element made of friction-wearing material 20 is lower due to the heat dissipation, the difference in expansion between support frame 10 and element made of friction-wearing material 20 is reduced and this makes the union of the two components more stable.

In order to optimize the heat dissipation, the pair of right and left pads 1 are different since the left one must leave space for the passage of the mounting tool 60 (FIG. 6).

In order to increase the heat conduction between the two surfaces in mutual contact of the support frame 10 and of the mounting portion 31 of the heat-dissipating element 30, a temperature-resistant thermo-conductive bi-adhesive layer is arranged between the aforementioned two surfaces.

With reference to FIGS. 4 and 8, the fins 37 can be provided on the surface of the heat-dissipating element 30 which faces the passage zone of the brake disc so that when the heat-dissipating element 30 is coupled with the frame the bases of the fins 37 are at the same level as the face 11 of the support frame 10 and the free ends of the fins 37 project with respect to such a face 11 or, preferably, so that when the heat-dissipating element 30 is coupled with the frame the free ends of the fins 37 are at the same level as the face 11 of the support frame 10 and the bases of the fins 37 are in recessed position with respect to such a face 11.

Of course, those skilled in the art can make numerous modifications and changes to the present invention in order to satisfy specific and contingent requirements, all of which are in any case within the scope of protection defined by the following claims

What is claimed is:

1. A pad for a bicycle disc brake comprising;
a support frame having a first face, a second face, a first portion and a second portion, the first face of the support frame supports a wear element on the first portion and the second face of the support frame is associated with a heat-dissipating element having a first side and a second side;
the second portion of the support frame has a first through aperture dimensioned to receive a fastener for attaching the brake pad to a disc brake assembly and at least one second through aperture that is configured and dimensioned to receive a complementary projection that extends from the first side of the heat-dissipating element and orients a plurality of fins extending from the second side of the heat-dissipating element with respect to the second face of the support frame;
wherein the support frame has a first coefficient of thermal conductivity and a first coefficient of thermal expansion, and the heat-dissipating element has a second coefficient of thermal conductivity greater than the first coefficient of thermal conductivity and a second coefficient of thermal expansion greater than the first coefficient of thermal expansion.

2. The pad according to claim 1, wherein said support frame comprises, on said second face, opposite projecting side edges and a recess defined between said opposite projecting side edges.

3. The pad according to claim 1, wherein said heat-dissipating element comprises a mounting portion coupled with said second portion of said support frame and a service portion projecting cantilevered with respect to said support frame.

4. The pad according to claim 3, wherein said first portion of said support frame is defined on a first face of said support frame and said second portion of said support frame is defined on a second face of said support frame opposite said first face and wherein said service portion comprises a plurality of fins including first fins that extend cantilevered from a first front surface of said heat-dissipating element which faces towards said second face and second fins that extend cantilevered from a second front surface of said heat-dissipating element which faces on the opposite side with respect to said first front surface.

5. The pad according to claim 4, wherein each of said first fins has a height lower than the height of each of said second fins.

6. The pad according to claim 4, wherein some fins of said second fins have at least in part a height lower than the height of the remaining fins of said second fins.

7. The pad according to claim 4, wherein some fins of said second fins are each a three-dimensional shape different from that of each of the remaining fins of said second fins.

8. The pad according to claim 1, wherein said support frame is a first material and wherein said heat-dissipating element is a different second material.

9. The pad according to claim 8, wherein said first material is a steel or ferromagnetic material and said second material is aluminum or an aluminum alloy.

10. The pad according to claim 1, wherein said heat-dissipating element is defined by a solid body provided with a single through opening.

11. The pad according to claim 1, wherein said heat-dissipating element is fixed to said support frame through chamfering.

12. A brake caliper for a bicycle disc brake comprising: a main body configured to be associated with a bicycle frame, the main body defining a slit in which at least one pair of pads according to claim 1 are inserted.

13. The pad according to claim 1, wherein said heat-dissipating element is defined by a solid body having a single through opening shaped as an open slot.

* * * * *